US010021030B2

(12) United States Patent
Gan et al.

(10) Patent No.: US 10,021,030 B2
(45) Date of Patent: Jul. 10, 2018

(54) METHOD AND SYSTEM FOR FORWARDING INFORMATION IN DISTRIBUTED NETWORK

(71) Applicant: ZTE Corporation, Shenzhen, Guangdong (CN)

(72) Inventors: Yuxi Gan, Shenzhen (CN); Qiandeng Liang, Shenzhen (CN); Liang Fan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 304 days.

(21) Appl. No.: 14/786,519

(22) PCT Filed: Sep. 18, 2013

(86) PCT No.: PCT/CN2013/083833
§ 371 (c)(1),
(2) Date: Oct. 22, 2015

(87) PCT Pub. No.: WO2014/173066
PCT Pub. Date: Oct. 30, 2014

(65) Prior Publication Data
US 2016/0072714 A1 Mar. 10, 2016

(30) Foreign Application Priority Data
Apr. 23, 2013 (CN) .......................... 2013 1 0142922

(51) Int. Cl.
*H04L 12/721* (2013.01)
*H04L 12/813* (2013.01)
(Continued)

(52) U.S. Cl.
CPC .............. *H04L 47/20* (2013.01); *H04L 41/00* (2013.01); *H04L 41/0893* (2013.01);
(Continued)

(58) Field of Classification Search
CPC ....... G06F 13/385; G06F 9/541; H04L 12/42; H04L 12/462; H04L 41/0806;
(Continued)

(56) References Cited

U.S. PATENT DOCUMENTS

2006/0136987 A1 6/2006 Okuda
2012/0033613 A1\* 2/2012 Lin ..................... H04W 74/085
370/328
(Continued)

FOREIGN PATENT DOCUMENTS

CN 1845531 A 10/2006
CN 102783098 A 11/2012
(Continued)

OTHER PUBLICATIONS

Supplementary European Search Report in European application No. 13882921.3, dated Mar. 23, 2016.
(Continued)

*Primary Examiner* — Le H Luu
(74) *Attorney, Agent, or Firm* — Oppedahl Patent Law Firm LLC

(57) ABSTRACT

Disclosed is a method for forwarding information in a distributed network, including that when receiving a message of an Application (APP) protocol, a forwarding device sends, according to a forwarding rule that is sent by a Software Defined Networking (SDN)/OpenFlow controller and corresponds to the APP protocol, the message to a corresponding application server directly or sends the message to a corresponding terminal directly. The disclosure further discloses a system for forwarding information in a distributed network. A transmission bandwidth of a control message between a network control layer and a forwarding layer can be ensured by means of the disclosure, thereby ensuring the stability of an SDN/OpenFlow message
(Continued)

between the network control layer and the forwarding layer and ensuring system expansibility.

13 Claims, 7 Drawing Sheets

(51) Int. Cl.
 *H04L 12/24* (2006.01)
 *H04L 29/06* (2006.01)
(52) U.S. Cl.
 CPC .............. *H04L 45/38* (2013.01); *H04L 45/44* (2013.01); *H04L 45/566* (2013.01); *H04L 69/24* (2013.01)
(58) Field of Classification Search
 CPC ..... H04L 41/0896; H04L 41/12; H04L 45/38; H04L 45/566; H04L 45/64; H04L 47/20; H04L 41/0893; H04L 41/00; H04L 69/24; H04L 45/44; H04W 28/06; H04W 74/085
 See application file for complete search history.

(56) References Cited

U.S. PATENT DOCUMENTS

| 2012/0102144 | A1* | 4/2012 | Fritsche .................. H04L 12/42 709/217 |
| 2012/0218942 | A1* | 8/2012 | Lu .......................... H04W 28/06 370/328 |
| 2012/0314605 | A1 | 12/2012 | Akiyoshi |
| 2013/0064243 | A1 | 3/2013 | Akiyoshi |
| 2013/0148537 | A1 | 6/2013 | Uchida |
| 2013/0159379 | A1* | 6/2013 | Boskovic ................ G06F 9/541 709/203 |
| 2013/0235869 | A1 | 9/2013 | Akiyoshi |
| 2013/0322257 | A1 | 12/2013 | Shimonishi |
| 2013/0332542 | A1* | 12/2013 | Foo ...................... G06F 13/385 709/206 |
| 2014/0079070 | A1 | 3/2014 | Sonoda |
| 2014/0348171 | A1 | 11/2014 | Akiyoshi |
| 2014/0348172 | A1 | 11/2014 | Akiyoshi |
| 2016/0020946 | A1* | 1/2016 | Morper ................ H04L 41/0806 709/222 |
| 2016/0020998 | A1* | 1/2016 | Bifulco ................... H04L 45/64 370/235 |
| 2016/0036706 | A1* | 2/2016 | Hiscock ................ H04L 12/462 370/230 |
| 2016/0036730 | A1* | 2/2016 | Kutscher ................. H04L 45/38 370/401 |
| 2016/0043941 | A1* | 2/2016 | D'Heureuse ........ H04L 41/0896 370/390 |
| 2016/0050104 | A1* | 2/2016 | Wackerly ................ H04L 41/12 370/220 |
| 2016/0050122 | A1* | 2/2016 | Cortes Gomez ...... H04L 45/566 713/168 |
| 2016/0065471 | A1 | 3/2016 | Akiyoshi |

FOREIGN PATENT DOCUMENTS

| CN | 102959908 A | 3/2013 |
| WO | 2012029422 A1 | 3/2012 |
| WO | 2012070173 A1 | 5/2012 |
| WO | 2012098596 A1 | 7/2012 |
| WO | 2012144194 A1 | 10/2012 |

OTHER PUBLICATIONS

International Search Report in international application No. PCT/CN2013/083833, dated Jan. 30, 2014.

English Translation of the Written Opinion of the International Search Authority in international application No. PCT/CN2013/083833, dated Jan. 30, 2014.

Rob Sherwood: "An Experimenter's Guide to OpenFlow", Jun. 1, 2010 (Jun. 1, 2010), XP055461439, Retrieved from the Internet:URL:http://www.rob-sherwood.net/GENI-ExperimentersWorkshop.ppt [retrieved on Mar. 21, 2018].

* cited by examiner

METHOD AND SYSTEM FOR FORWARDING INFORMATION IN DISTRIBUTED NETWORK

TECHNICAL FIELD

The disclosure relates to a forwarding technology in the field of mobile communications, and particularly to a method and system for forwarding information in a distributed network.

BACKGROUND

After more than 40 years of development, the Internet on basis of Transmission Control Protocol (TCP)/Internet Protocol (IP) has become one of the indispensable infrastructures in work, study and life. At present, Software Defined Networking (SDN) has been put forward by Scott Shenker et al. of the Berkeley University and an OpenFlow network has been put forward by engineers of the Stanford University. The SDN/OpenFlow network is an open programmable network to implement rapid and flexible deployment of protocols.

A network control layer of needs to process a large number of messages corresponding to Application (APP) protocols related to a terminal user, such as a Point to Point Protocol (PPP), a Dynamic Host Configuration Protocol (DHCP), a Remote Authentication Dial In User Service (RADIUS) protocol and so on, or routing protocol messages between the SDN/OpenFlow network and a non-SDN/OpenFlow network. The network control layer further needs to forward a large number of routing protocol messages between a terminal and an APP layer, and between the APP layer and a non-SDN/OpenFlow network device in real time. However, these messages are not necessarily parsed and processed by the network control layer, and thus a transmission bandwidth between the network control layer and a forwarding layer can be hardly ensured.

Therefore, a transmission bandwidth of a control message between a network control layer and a forwarding layer can be hardly ensured in an SDN/OpenFlow network in the prior art, which further affects the stability of an SDN/OpenFlow message between the network control layer and the forwarding layer and increases the burden of the network control layer, thereby further affecting system expansibility.

SUMMARY

In view of this, one of the objectives in the disclosure is to provide a method and system for forwarding information in a distributed network so as to ensure a transmission bandwidth of a control message between a network control layer and a forwarding layer, thereby ensuring the stability of an SDN/OpenFlow message between the network control layer and the forwarding layer and ensuring system expansibility.

To this end, the technical solution of the disclosure is implemented in the following way.

An embodiment of the disclosure provides a method for forwarding information in a distributed network. The method includes that, when receiving a message of an APP protocol, a forwarding device sends the message to a corresponding APP server directly or sends the message to a corresponding terminal directly according to a forwarding rule that is sent by an SDN/OpenFlow controller and corresponds to the APP protocol.

In the solution, the operation that the message is sent to the corresponding APP server directly or the message is sent to the corresponding terminal directly according to the forwarding rule that is sent by the SDN/OpenFlow controller and corresponds to the APP protocol includes that, the forwarding device checks whether there is the forwarding rule corresponding to the APP protocol stored in the forwarding device, and if no, the forwarding device acquires the forwarding rule corresponding to the APP protocol from the SDN/OpenFlow controller and sends the message to the corresponding APP server directly or sends the message to the corresponding terminal directly according to the forwarding rule corresponding to the APP protocol; and otherwise, the forwarding device sends the message to the corresponding APP server directly or sends the message to the corresponding terminal directly according to the forwarding rule corresponding to the APP protocol.

In the solution, before the message is sent to the corresponding APP server directly or the message is sent to the corresponding terminal directly according to the forwarding rule that is sent by the SDN/OpenFlow controller and corresponds to the APP protocol, the method further includes that, the SDN/OpenFlow controller selects a forwarding device according to a preset condition, and delivers the forwarding rule corresponding to the APP protocol to the forwarding device.

In the solution, the operation that the forwarding device acquires the forwarding rule corresponding to the APP protocol from the SDN/OpenFlow controller includes that the forwarding device initiates a query message to the SDN/OpenFlow controller, and the SDN/OpenFlow controller sends the forwarding rule corresponding to the APP protocol to the forwarding device according to the query message.

In the solution, after the message is sent to the corresponding APP server directly, or the message is sent to the corresponding terminal directly, the method further includes that, the APP server sends a state update message to the SDN/OpenFlow controller periodically, as required or in real time; and the SDN/OpenFlow controller updates a forwarding rule of a data message according to the state update message, and sends the updated forwarding rule of the data message to the forwarding device initiatively or after receiving a request from the forwarding device.

An embodiment of the disclosure further provides a system for forwarding information in a distributed network. The system includes a forwarding device and an SDN/OpenFlow controller, wherein the forwarding device is configured to send, when receiving a message of an APP protocol, the message to a corresponding APP server directly or send the message to a corresponding terminal directly according to a forwarding rule that is sent by the SDN/OpenFlow controller and corresponds to the APP protocol; and the SDN/OpenFlow controller is configured to send the forwarding rule corresponding to the APP protocol to the forwarding device.

In the solution, the forwarding device is configured to check whether there is the forwarding rule corresponding to the APP protocol stored in the forwarding device, and if no, acquire the forwarding rule corresponding to the APP protocol from the SDN/OpenFlow controller, and send the message to the corresponding APP server directly or send the message to the corresponding terminal directly according to the forwarding rule corresponding to the APP protocol; otherwise, send the message to the corresponding APP server directly or send the message to the corresponding terminal directly according to the forwarding rule corresponding to the APP protocol.

In the solution, the SDN/OpenFlow controller is configured to select a forwarding device according to a preset condition, and deliver the forwarding rule corresponding to the APP protocol to the forwarding device.

In the solution, the forwarding device is configured to initiate a query message to the SDN/OpenFlow controller; correspondingly, the SDN/OpenFlow controller is configured to send the forwarding rule corresponding to the APP protocol to the forwarding device according to the query message sent by the forwarding device.

In the solution, the SDN/OpenFlow controller is configured to update a forwarding rule of a data message according to a state update message sent by the APP server periodically, as required or in real time, and send the updated forwarding rule of the terminal message to the forwarding device initiatively or after receiving a request from the forwarding device.

According to a method and a system for forwarding information in a distributed network provided by the disclosure, a forwarding device can send, when receiving a message of an APP protocol, the message to a corresponding APP server or send the message to a corresponding terminal according to a forwarding rule that is acquired from an SDN/OpenFlow controller and corresponds to the APP protocol. In this way, information of a non-SDN/OpenFlow protocol is sent to a target address directly without passing through a network control layer, and thus a transmission bandwidth of a control message between the network control layer and a forwarding layer can be ensured, thereby further ensuring the stability of an SDN/OpenFlow message between the network control layer and the forwarding layer and ensuring system expansibility.

DETAILED DESCRIPTION

The basic idea of the embodiments of the disclosure is that: when receiving a message of an APP protocol, a forwarding device sends the message to a corresponding APP server or sends the message to a corresponding terminal according to a forwarding rule that is acquired from an SDN/OpenFlow controller and corresponds to the APP protocol.

Specifically, when receiving the message of the APP protocol, the forwarding device checks whether there is the forwarding rule corresponding to the APP protocol stored in the forwarding device, and if no, the forwarding device acquires the forwarding rule corresponding to the APP protocol from the SDN/OpenFlow controller and sends the message to the corresponding APP server or sends the message to the corresponding terminal according to the forwarding rule corresponding to the APP protocol; otherwise, the forwarding device sends the message to the corresponding APP server or sends the message to the corresponding terminal according to the forwarding rule corresponding to the APP protocol.

The disclosure will be further expounded below with reference to the accompanying drawings and specific embodiments.

Figure 1:
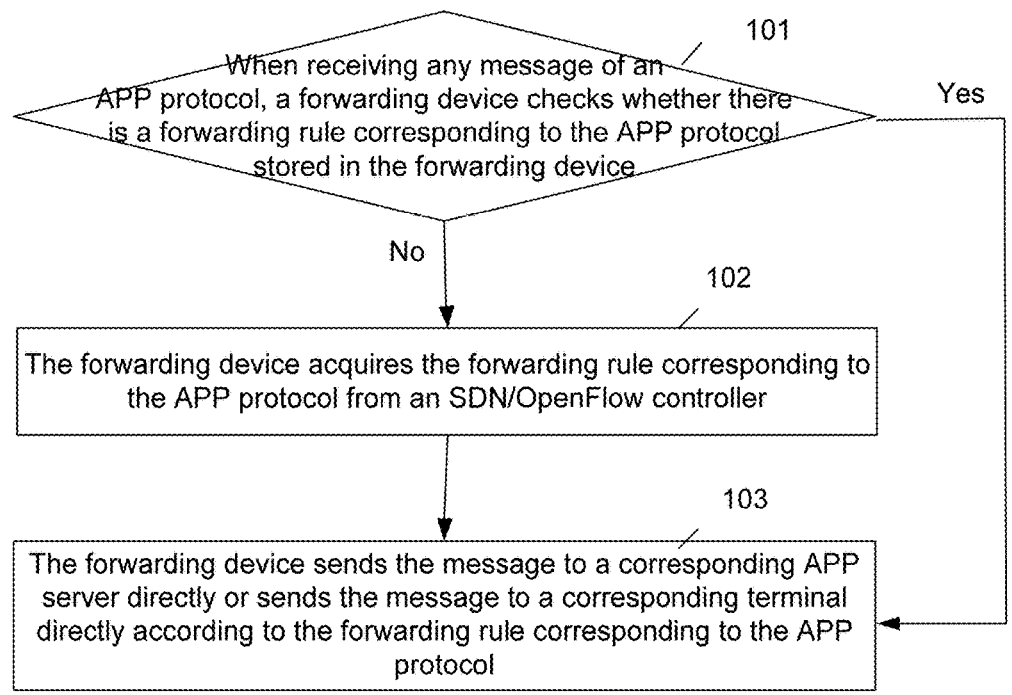
FIG. 1 is a flowchart of a method for forwarding information in a distributed network according to an embodiment of the disclosure.

FIG. 1 shows a method for forwarding information in a distributed network according to an embodiment of the disclosure, including the following steps.

Step 101: When receiving any message of an APP protocol, a forwarding device checks whether there is a forwarding rule corresponding to the APP protocol stored in the forwarding device. If there is no a forwarding rule corresponding to the APP protocol stored in the forwarding device, Step 102 is performed. Otherwise, Step 103 is performed.

Herein, the APP protocol is any APP protocol including a communication protocol between a user terminal and an APP layer and a communication protocol between a device in a non-SDN/OpenFlow network and an SDN/OpenFlow network besides an SDN/OpenFlow protocol between an SDN/OpenFlow controller and the forwarding device. For example, the APP protocol may be a Point-to-Point Protocol over Ethernet (PPPoE), an Open Shortest Path First (OSPF) protocol, an Internet Group Management Protocol (IGMP) v2 and so on.

The forwarding rule corresponding to the APP protocol is a matching condition and a matching result of all types of messages corresponding to the APP protocol, wherein the matching condition includes a protocol type and a target Media Access Control Address (MAC) and the matching result is information of an output interface of the forwarding device.

The message of the APP protocol may be a message of the APP protocol sent by a terminal, and may be also a response message to the message of the APP protocol, wherein the response message is returned by an APP server.

Preferably, before Step 101 is performed, the forwarding device may further receive a forwarding rule that is delivered by an SDN/OpenFlow controller and corresponds to the APP protocol, wherein the SDN/OpenFlow controller may be one or more forwarding devices selected according to a preset condition.

Preferably, the SDN/OpenFlow controller may further generate, according to a registration message sent by one or more APP servers, a forwarding rule of an APP protocol corresponding to the APP server/APP servers.

Step 102: The forwarding device acquires the forwarding rule corresponding to the APP protocol from the SDN/OpenFlow controller.

Specifically, the forwarding device initiates a query message to the SDN/OpenFlow controller, and the SDN/Open- Flow controller sends the forwarding rule corresponding to the APP protocol to the forwarding device according to the query message.

Herein, the query message may include all SDN/OpenFlow of the message of the APP protocol and a request for acquiring the forwarding rule may be a query message specified in an SDN/OpenFlow protocol.

Step 103: The forwarding device sends the message to a corresponding APP server directly or sends the message to a corresponding terminal directly according to the forwarding rule corresponding to the APP protocol.

Specifically, the forwarding device directly sends the message to the corresponding APP server according to the forwarding rule corresponding to the APP protocol when the message received by the forwarding device is a request message sent by a terminal, and directly sends the message to a corresponding terminal according to the forwarding rule corresponding to the APP protocol when the message received by the forwarding device is a response message returned by an APP server.

Herein, the operation that the message is sent directly to the corresponding APP server may include that the forwarding device sends, according to the forwarding rule corresponding to the APP protocol, the message to the corresponding APP server through routing formed by one or more forwarding devices. The routing formed by one or more forwarding devices is an existing technology and will not be repeated here.

The operation that the message is sent directly to the corresponding terminal may include that the forwarding device sends, according to the forwarding rule corresponding to the APP protocol, the message to the corresponding terminal or a device in an external network through routing formed by one or more forwarding devices. The routing formed by one or more forwarding devices is an existing technology and will not be repeated here.

Preferably, after Step 103 is completed, the method may further include that the APP server sends a state update message to the SDN/OpenFlow controller periodically, as required or in real time. The SDN/OpenFlow controller updates a forwarding rule of a data message according to the state update message, and sends the updated forwarding rule of the data message to the forwarding device initiatively or after receiving a request from the forwarding device.

Herein, the state update message includes a change in user information and/or a change in routing information. The change in the user information includes, but is not limited to, addition, modification and deletion of an item of a user list, and modification of user authorization information. The change in the routing information includes, but is not limited to, a routing update of various unicast/multicast routing protocols and a user routing update.

Figure 2:
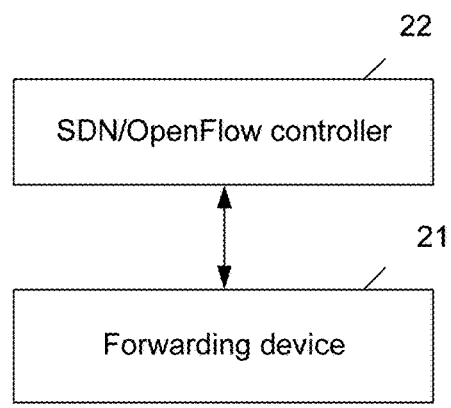
FIG. 2 is a structural diagram of a system for forwarding information in a distributed network according to an embodiment of the disclosure.

FIG. 2 shows a system for forwarding information in a distributed network according to an embodiment of the disclosure. The system includes a forwarding device 21 and an SDN/OpenFlow controller 22.

The forwarding device 21 is configured to send, when receiving a message of an APP protocol, the message to a corresponding APP server directly or send the message to a corresponding terminal directly according to a forwarding rule that is sent by the SDN/OpenFlow controller 22 and corresponds to the APP protocol.

The SDN/OpenFlow controller 22 is configured to send the forwarding rule corresponding to the APP protocol to the forwarding device 21.

The forwarding device 21 is configured to check, when receiving any message of an APP protocol, whether there is a forwarding rule corresponding to the APP protocol stored in the forwarding device, and if no, acquire the forwarding rule corresponding to the APP protocol from the SDN/OpenFlow controller 22; otherwise, send the message to the corresponding APP server directly or send the message to the corresponding terminal directly according to the forwarding rule corresponding to the APP protocol.

Herein, the APP protocol is any APP protocol including a communication protocol between a user terminal and an APP layer and a communication protocol between a device in a non-SDN/OpenFlow network and an SDN/OpenFlow network besides an SDN/OpenFlow protocol between the SDN/OpenFlow controller and the forwarding device. For example, the APP protocol may be a PPPoE, an OSPF protocol, an IGMP v2 and so on.

The forwarding device 21 may further receive the forwarding rule that is sent by the SDN/OpenFlow controller 22 and corresponds to the APP protocol, wherein the SDN/OpenFlow controller may be one or more forwarding devices selected according to a preset condition.

The SDN/OpenFlow controller 22 is configured to generate, according to a registration message sent by one or more APP servers, a forwarding rule of an APP protocol corresponding to the APP server/APP servers.

The forwarding device 21 is configured to initiate a query message to the SDN/OpenFlow controller 22 and receive the forwarding rule corresponding to the APP protocol from the SDN/OpenFlow controller 22. Correspondingly, the SDN/OpenFlow controller 22 is configured to send the forwarding rule corresponding to the APP protocol to the forwarding device 21 according to the query message sent by the forwarding device 21. Herein, the query message may include all SDN/OpenFlow of the message of the APP protocol and a request for acquiring the forwarding rule may be a query message specified in an SDN/OpenFlow protocol.

The forwarding device 21 is configured to send the message to the corresponding APP server directly or send the message to the corresponding terminal directly according to the forwarding rule corresponding to the APP protocol.

The forwarding device 21 is configured to directly send the message to the corresponding APP server according to the forwarding rule corresponding to the APP protocol when the received message is a request message sent by a terminal, and directly send the message to the corresponding terminal according to the forwarding rule corresponding to the APP protocol when the received message is a response message returned by an APP server.

The forwarding device 21 is configured to send, according to the forwarding rule corresponding to the APP protocol, the message to the corresponding APP server through routing formed by one or more forwarding devices. The routing formed by one or more forwarding devices is an existing technology and will not be repeated here.

The forwarding device 21 is configured to send, according to the forwarding rule corresponding to the APP protocol, the message to the corresponding terminal or a device in an external network through routing formed by one or more forwarding devices. The routing formed by one or more forwarding devices is an existing technology and will not be repeated here.

The SDN/OpenFlow controller 22 is configured to update a forwarding rule of a data message of the terminal according to a state update message sent by the APP server periodically, as required or in real time, and send the updated forwarding rule of the data message of the terminal to the forwarding device initiatively or after receiving a request from the forwarding device. Herein, the state update message includes a change in user information and/or a change in routing information. The change in the user information includes, but is not limited to, addition, modification and deletion of an item of a user list, and modification of user authorization information. The change in the routing information includes, but is not limited to, a routing update of various unicast/multicast routing protocols and a user routing update.

Embodiment 1

Figure 3:
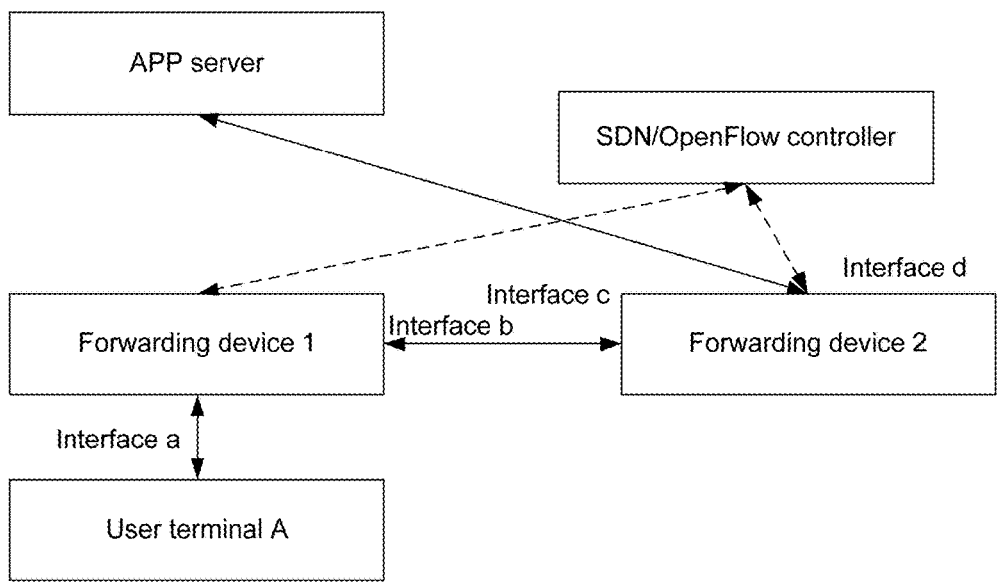
FIG. 3 is a structural diagram of a system in the first embodiment of the disclosure.
Figure 4:
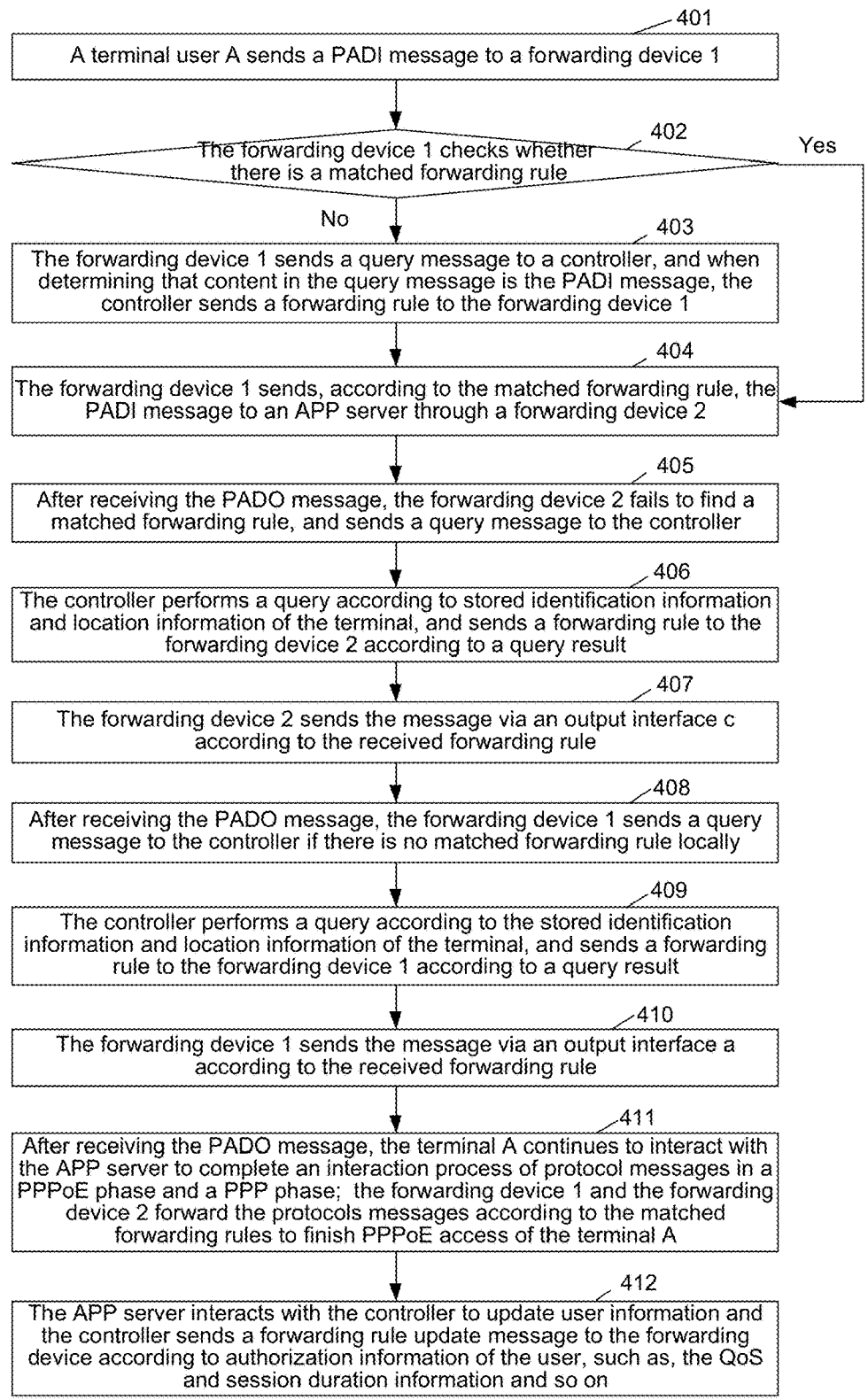
FIG. 4 is a flowchart of a method for forwarding information in a distributed network in the first embodiment of the disclosure.

FIG. 3 shows a networking diagram by taking a PPPoE access user as an example, wherein a PPP APP represents a network device where the PPP APP is processed, and a specific flowchart is as shown in FIG. 4.

Step 401: A terminal user A sends a PPPoE Active Discovery Initiation (PADI) message to a forwarding device 1.

Step 402: The forwarding device 1 checks whether there is a matched forwarding rule. If yes, Step 404 is performed. Otherwise, Step 403 is performed.

Step 403: The forwarding device 1 sends a query message to a controller, and when determining that content in the query message is the PADI message, the controller sends a forwarding rule to the forwarding device 1.

Herein, the query message may include all content of the PADI message.

The forwarding rule includes a matching condition in which an Ethernet type field is a message type (0x8863) of a PPPoE protocol or a message (0x8864) of a PPP protocol and a target MAC address is a broadcast address, or an MAC address of the PPP APP, and a matching result which is information of an output interface of the forwarding device 1. The forwarding rule may further include: when a PPPoE or PPP message of another terminal satisfies the matching condition of the rule, but a forwarding rule in which a source MAC address of the PADI message is a target MAC address is not on the forwarding device 1, the forwarding device 1 sends a copy of the message to the controller, and the controller learns and stores an MAC address of the terminal and an interface of the forwarding device 1 directly connected with the terminal.

Herein, the information of the output interface of the forwarding device 1 may be an interface for connecting the forwarding device 1 and another forwarding device 2 directly, i.e. an interface b of the forwarding device 1. Alternatively, when the forwarding device 1 is connected with the PPP APP directly, the information of the output interface is an interface for connecting the forwarding device 1 and a PPP APP device directly.

Preferably, when a network device where the PPP APP is located is not connected with the forwarding device 1 directly, the controller simultaneously sends a corresponding forwarding rule to the forwarding device 1 and another forwarding device (which is the forwarding device 2 in the present embodiment) between the controller and the network device. In this case, the forwarding rule includes the same matching condition, and information of an output interface is modified according to other different forwarding devices. The forwarding rule is not necessary to be sent again to a forwarding device having the rule stored. Alternatively, the controller waits for a query message from another forwarding device, and then sends a corresponding forwarding rule to said another forwarding device.

Step 404: The forwarding device 1 sends, according to the matched forwarding rule, the PADI message to the PPP APP through the forwarding device 2.

Preferably, if the controller sends a corresponding forwarding rule (with the same matching condition and an output interface d) to the forwarding device 2 simultaneously in Step 403, the forwarding device 2 sends the PADI message according to the forwarding rule; otherwise, the forwarding device 2 re-sends a query message to the controller, and the controller delivers a forwarding rule subsequently, which are similar to Step 402 and Step 403.

Step 405: After receiving the PADI message, the network device where the PPP APP is located returns a PPPoE Active Discovery Offer (PADO) message to the forwarding device 2.

Step 406: After receiving the PADO message, the forwarding device 2 fails to find a matched forwarding rule (an Ethernet type field is 0x8863 and a target MAC address is an MAC address of the terminal) and sends a query message to the controller.

Step 407: The controller performs a query according to stored identification information and location information of the terminal, and sends a forwarding rule (a target MAC address is an MAC address of the terminal and an output interface is c) to the forwarding device 2 according to a query result.

Step 408: The forwarding device 2 sends the message via the output interface c according to the received forwarding rule.

Step 409: After receiving the PADO message, the forwarding device 1 sends a query message to the controller if there is no matched forwarding rule locally (an Ethernet type field is 0x8863 and a target MAC address is an MAC address of the terminal).

Step 410: The controller performs a query according to the stored identification information and location information of the terminal, and sends a forwarding rule (a target MAC address is an MAC address of the terminal and an output interface is a) to the forwarding device 1 according to a query result.

Step 411: The forwarding device 1 sends the message via the output interface a according to the received forwarding rule.

Step 412: After receiving the PADO message, a terminal A continues to interact with the PPP APP to complete an interaction process of protocols messages during a PPPoE phase and a PPP phase. The forwarding device 1 and the forwarding device 2 forward the protocols messages according to the matched forwarding rules to finish the PPPoE access of the terminal A finally.

Step 413: The PPP APP interacts with the controller to update user information (e.g. addition of a user list) and the controller sends a forwarding rule update message to the forwarding device according to authorization information of the user, such as, the Quality of Service (QoS) and the session duration information and so on.

Preferably, other methods for accessing a user, such as DHCP, a static user, Web authentication and Portal authentication access and so on, may be also implemented by the same or a similar method.

Embodiment 2

Figure 5:
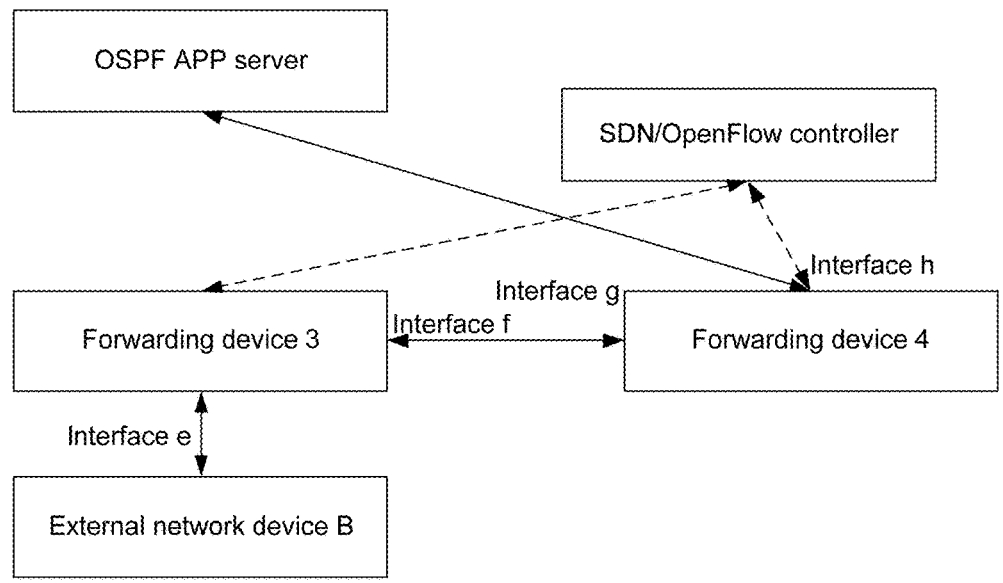
FIG. 5 is a structural diagram of a system in the second embodiment of the disclosure.
Figure 6:
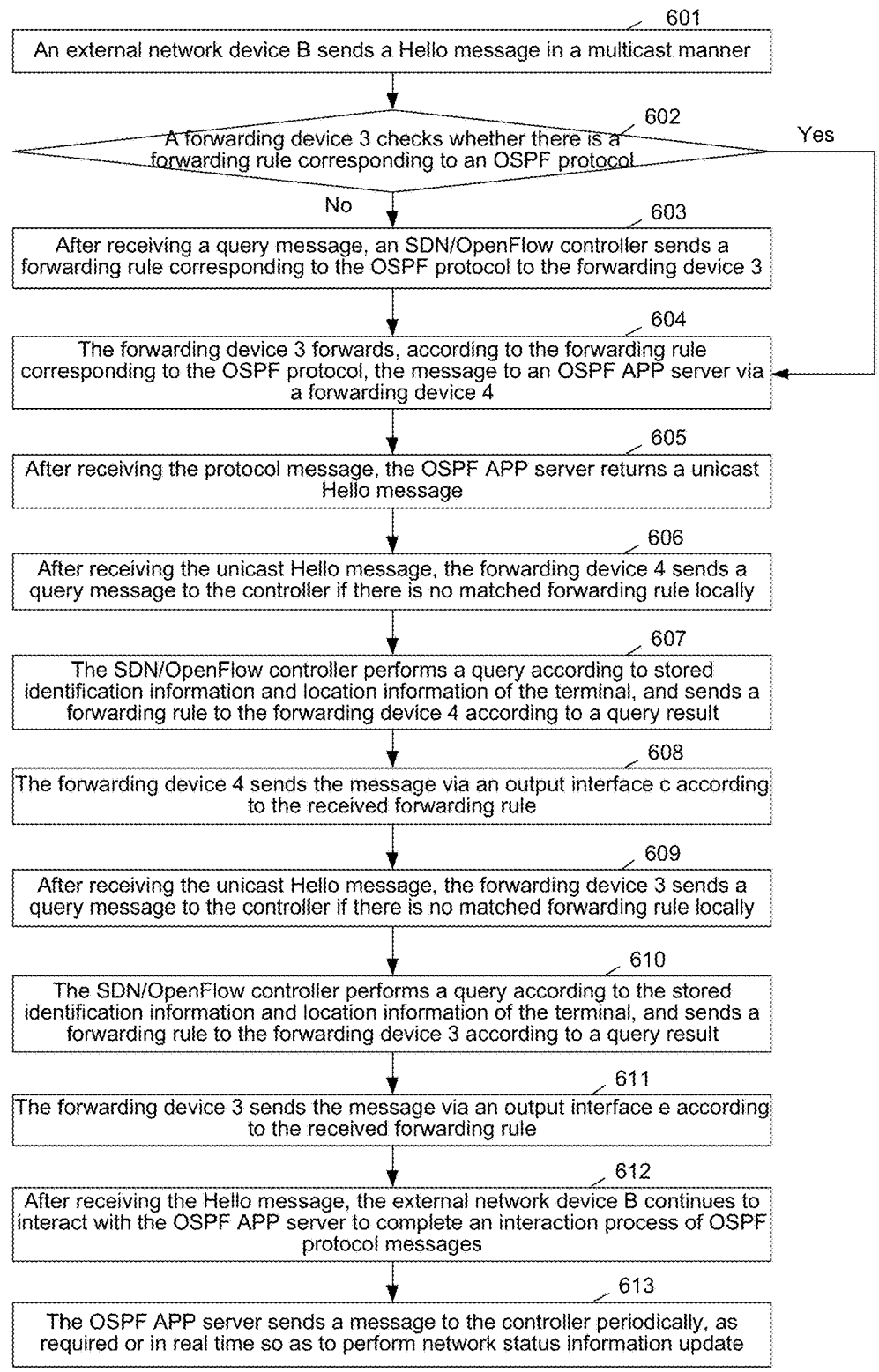
FIG. 6 is a flowchart of a method for forwarding information in a distributed network in the second embodiment of the disclosure.

An establishment phase of an OSPF protocol is taken as an example of interaction of routing protocols of an external network. FIG. 5 shows a networking diagram. An external network device B represents a router device outside an SDN/OpenFlow network, and is directly connected with a forwarding device 3 in the SDN/OpenFlow network. An OSPF APP server represents a network device where an APP for processing the OSPF is located. A specific flow is shown in FIG. 6.

Step 601: The external network device B sends a Hello message in a multicast manner.

Step 602: The forwarding device 3 checks whether there is a forwarding rule corresponding to the OSPF protocol. If so, Step 604 is performed. Otherwise, the forwarding device 3 sends a query message to an SDN/OpenFlow controller, and Step 603 is performed.

Step 603: After receiving the query message, the SDN/OpenFlow controller sends a forwarding rule corresponding to the OSPF protocol to the forwarding device 3.

The forwarding rule includes an IP message protocol field value which is an OSPF protocol message type (89), and a target IP address which is a multicast address or an IP address of an OSPF APP as a matching condition and simultaneously includes information of an output interface of the forwarding device 3. The output interface is an interface connecting the forwarding device 3 and a forwarding device 4 directly, i.e. an interface f on the forwarding device 3.

Preferably, if the forwarding device 3 is connected with the OSPF APP directly, the output interface is a direct connection interface.

Preferably, if the network device where the APP for processing the OSFP protocol is located is not connected with the forwarding device 3 directly, the controller simultaneously sends a corresponding forwarding rule to the forwarding device 3 and another forwarding device (the forwarding device 4 in the present embodiment) between the controller and the network device. The forwarding rule includes the same matching condition, and the output interface is modified according to other different forwarding devices. The forwarding rule is not necessary to be synchronously sent to a forwarding device having the rule stored. Alternatively, the controller waits for a query message from another forwarding device, and then sends a corresponding forwarding rule to said another forwarding device.

Preferably, the forwarding rule further include that if an OSPF message of another external network device satisfies the matching condition of the rule, but a forwarding rule in which a source IP address of the message is a target IP address is not on the forwarding device 3, the forwarding device 3 sends a copy of the message to the controller, and the controller learns and stores an IP address of the external network device and an interface of the forwarding device 3 connected with the external network device directly.

Step 604: The forwarding device 3 forwards, according to the forwarding rule corresponding to the OSPF protocol, the message to the OSPF APP server via the forwarding device 4.

Preferably, if the controller has sent a corresponding forwarding rule (including the same matching condition and an output interface h) to the forwarding device 4 simultaneously in Step 403, the forwarding device 4 forwards the message according to the rule; otherwise, the forwarding device 4 re-sends a query message to the controller, and the controller delivers a forwarding rule subsequently, which are similar to Step 602 and Step 603.

Step 605: After receiving the protocol message, the OSPF APP server returns a unicast Hello message with the IP address of the external network device B as a target IP address, i.e. a source IP address of the multicast Hello message received by the OSPF APP.

Step 606: After receiving the unicast Hello message, the forwarding device 4 sends a query message to the controller if there is no matched forwarding rule locally (an IP protocol field is 89 and a target IP address is a router IP address).

Step 607: The SDN/OpenFlow controller performs a query according to stored identification information and location information of the terminal, and sends a forwarding rule (a target IP address is the IP address of the external network device B and an output interface is g) to the forwarding device 4 according to a query result.

Step 608: The forwarding device 4 sends the message via the output interface c according to the received forwarding rule.

Step 609: After receiving the unicast Hello message, the forwarding device 3 sends a query message to the controller if there is no matched forwarding rule locally (an IP protocol field is 89 and a target IP address is the IP address of the external network device B).

Step 610: The SDN/OpenFlow controller performs a query according to the stored identification information and location information of the terminal, and sends a forwarding rule (a target IP address is the IP address of the external network device B and an output interface is e) to the forwarding device 3 according to a query result.

Step 611: The forwarding device 3 sends the message via the output interface e according to the received forwarding rule.

Step 612: After receiving the Hello message, the external network device B continues to interact with the OSPF APP server to complete an interaction process of OSPF protocol messages.

The forwarding device 3 and the forwarding device 4 forward the protocol messages according to the matched forwarding rules to establish an OSPF neighborhood relation between the external network device B and the OSPF APP server finally.

Preferably, an interaction process of other control messages including an OSPF routing update message and so on may be also implemented by the same or a similar method.

Preferably, other routing protocols, such as a Routing Information Protocol (RIP), an Intermediate System to Intermediate System (ISIS), a Border Gateway Protocol (BGP) and so on may be also implemented by the same or a similar method.

Step 613: The OSPF APP server sends a message to the controller periodically, as required or in real time so as to perform network status information update (e.g. a network topological change and routing update).

Embodiment 3

Figure 7:
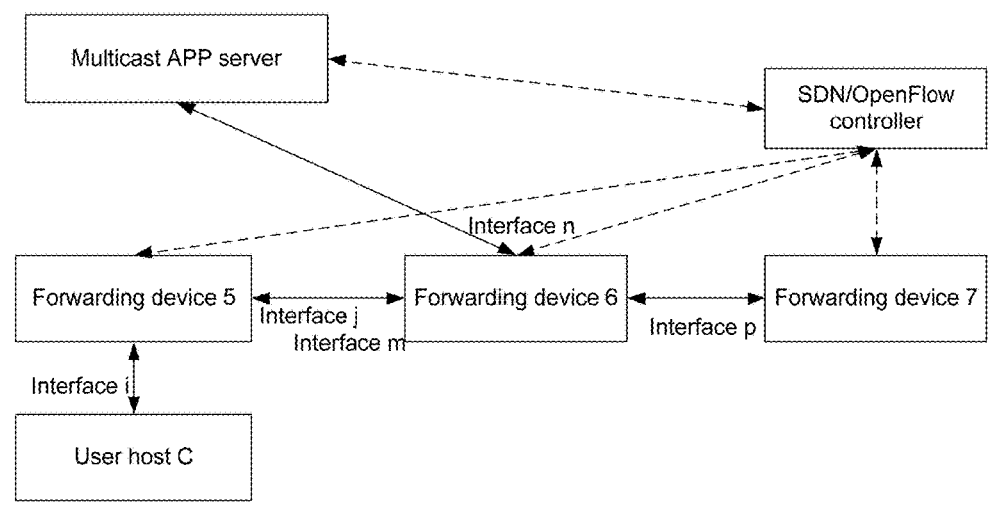
FIG. 7 is a structural diagram of a system in the third embodiment of the disclosure.
Figure 8:
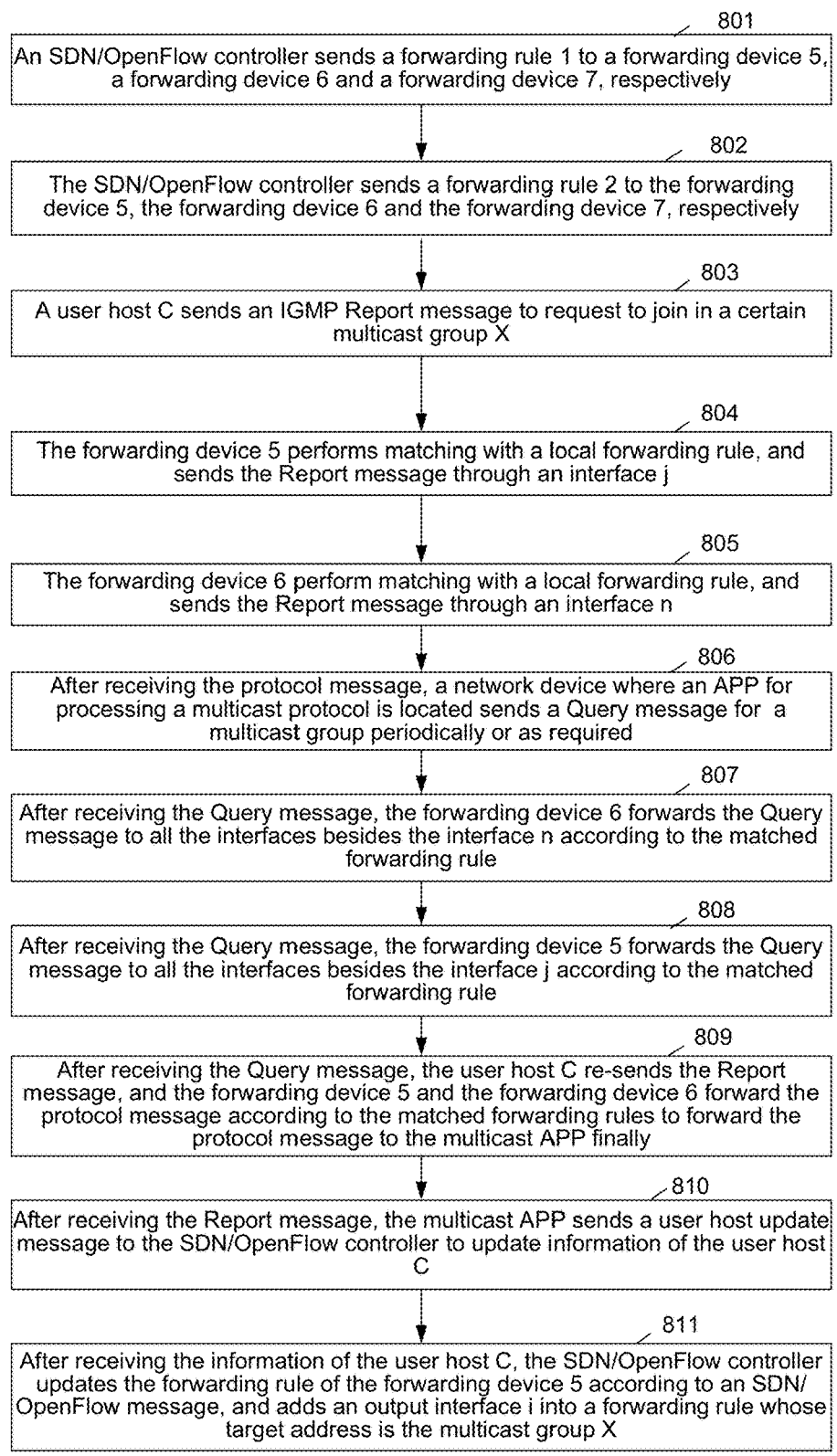
FIG. 8 is a flowchart of a method for forwarding information in a distributed network in the third embodiment of the disclosure.

Implementation of adding into a multicast service, checking a multicast service and departing from a multicast service through an IGMPv2 protocol is taken as an example of customization of a user service (description of a scenario). FIG. 7 shows a networking diagram. A multicast APP represents a network device where an APP for processing a multicast service is located, and a detailed flowchart is shown in FIG. 8.

Step 801: An SDN/OpenFlow controller sends a forwarding rule 1 to a forwarding device 5, a forwarding device 6 and a forwarding device 7, respectively. The forwarding rule 1 is a message with a target IP address 224.0.0.1 and an IP message protocol field value 2 (which represents an IGMP message sent by a query device). Output interfaces of the forwarding device 5 refer to all interfaces besides an interface n, output interfaces of the forwarding device 6 refer to all interfaces besides an interface j, and output interface of the forwarding device 6 refer to all interfaces besides an interface p.

Step 802: The SDN/OpenFlow controller sends a forwarding rule 2 to the forwarding device 5, the forwarding device 6 and the forwarding device 7, respectively. The forwarding rule 2 is a message (representing an IGMP message sent by a user host) with a target IP address 224.0.0.2 and an IP message protocol field value 2. An output interface of the forwarding device 5 is an interface n, an output interface of the forwarding device 6 is an interface j and an output interface of the forwarding device 6 is an interface p.

Preferably, Step 801 and Step 802 are performed in no particular order.

Step 803: A user host C sends an IGMP Report message to request to join in a certain multicast group X.

Step 804: The forwarding device 5 performs matching with a local forwarding rule, and sends the Report message through the interface j.

Preferably, if the forwarding rule received by the forwarding device 5 in Step 802 has become invalid, a query message is sent to the controller, and a query device repeats Step 802 to send the forwarding rule to the forwarding device 5.

Preferably, the forwarding device 5 finds a matched the forwarding rule locally and performs Step 804 while sending a copy of the message to the controller. The controller learns and stores an IP address of the user host C and an interface of the forwarding device 5 connected with the controller directly.

Step 805: The forwarding device 6 performs matching with a local forwarding rule, and sends the Report message through the interface n.

Preferably, if the forwarding rule received by the forwarding device 6 in Step 402 has become invalid, a query message is sent to the controller, and a query device repeats Step 402 to send the forwarding rule to the forwarding device 6.

Step 806: After receiving the protocol message, the network device where the APP for processing the multicast protocol is located sends a Query message with a target address of 224.0.0.1 for a multicast group periodically or as required.

Step 807: After receiving the Query message, the forwarding device 6 forwards the Query message to all interfaces besides the interface n according to the matched forwarding rule.

Preferably, if the forwarding rule received by the forwarding device 6 in Step 801 has become invalid, a query message is sent to the controller, and a query device repeats Step 801 to send the forwarding rule to the forwarding device 6.

Preferably, all the interfaces besides the interface n include an interface m.

Step 808: After receiving the Query message, the forwarding device 5 forwards the Query message to all interfaces besides the interface j according to the matched forwarding rule.

Preferably, if the forwarding rule received by the forwarding device 5 in Step 401 has become invalid, a query message is sent to the controller, and a query device repeats Step 401 to send the forwarding rule to the forwarding device 5.

Preferably, all the interfaces besides the interface j include an interface i.

Step 809: After receiving the Query message, the user host C re-sends the Report message, and the forwarding device 5 and the forwarding device 6 forward the protocol message according to the matched forwarding rules to forward the protocol message to the multicast APP finally.

Step 810: After receiving the Report message, the multicast APP sends a user host update message to the SDN/OpenFlow controller to update information of the user host C.

Step 811: After receiving the information of the user host C, the SDN/OpenFlow controller updates the forwarding rule of the forwarding device 5 according to an SDN/OpenFlow message, and adds an output interface i in a forwarding rule whose target address is the multicast group X.

Preferably, if an output interface m is not in the forwarding rule whose target address is the multicast group X on the forwarding device 6, the controller sends an SDN/OpenFlow message to the forwarding device 6 simultaneously to update the forwarding rule of the forwarding device 5, and adds an output interface m in the forwarding rule whose target address is the multicast group X.

Preferably, a flow in which the user host leaves from a certain multicast group is similar to the process in which the user host joins in a certain multicast group according to Step 801 to Step 811.

Preferably, customization of other multicast services based on a multicast protocol version may be also implemented by the same or a similar method.

Preferably, other user services, such as a video on demand, bandwidth adjustment, customization of a Peer-to-Peer (P2P) service and so on may be also implemented by the same or a similar method.

The above are only preferred embodiments of the disclosure, but are used for limiting the protection scope of the disclosure.

What is claimed is:

1. A method for forwarding information of Application (APP) protocol in a distributed network, comprising:
   sending, by a forwarding device, when a message of an APP protocol is received, the message to a corresponding APP server directly or sending the message to a corresponding terminal directly according to a forwarding rule that is sent by a Software Defined Networking (SDN)/OpenFlow controller and corresponds to the APP protocol;
   wherein the forwarding rule is a matching condition and a matching result of all types of messages corresponding to the APP protocol, wherein the matching condition includes a protocol type and a target Media Access Control, MAC, Address, and the matching result is information of an output interface of the forwarding device.

2. The method according to claim 1, wherein the operation of sending the message to the corresponding APP server directly or sending the message to the corresponding terminal directly according to the forwarding rule that is sent by the SDN/OpenFlow controller and corresponds to the APP protocol comprises:
   checking, by the forwarding device, whether there is the forwarding rule corresponding to the APP protocol stored in the forwarding device, and if no, acquiring, by the forwarding device, the forwarding rule corresponding to the APP protocol from the SDN/OpenFlow controller, sending, by the forwarding device, the message to the corresponding APP server directly or sending the message to the corresponding terminal directly according to the forwarding rule corresponding to the APP protocol; and otherwise, sending, by the forwarding device, the message to the corresponding APP server directly or sending the message to the corresponding terminal directly according to the forwarding rule corresponding to the APP protocol.

3. The method according to claim 2, wherein the operation of acquiring, by the forwarding device, the forwarding rule corresponding to the APP protocol from the SDN/OpenFlow controller comprises: initiating, by the forwarding device, a query message to the SDN/OpenFlow controller, and sending, by the SDN/OpenFlow controller, the forwarding rule corresponding to the APP protocol to the forwarding device according to the query message.

4. The method according to claim 2, further comprising:
before sending the message to the corresponding APP server directly or sending the message to the corresponding terminal directly according to the forwarding rule that is sent by the SDN/OpenFlow controller and corresponds to the APP protocol,
selecting, by the SDN/OpenFlow controller, a forwarding device according to a preset condition, and delivering the forwarding rule corresponding to the APP protocol to the forwarding device.

5. The method according to claim 1, further comprising:
before sending the message to the corresponding APP server directly or sending the message to the corresponding terminal directly according to the forwarding rule that is sent by the SDN/OpenFlow controller and corresponds to the APP protocol,
selecting, by the SDN/OpenFlow controller, a forwarding device according to a preset condition, and delivering the forwarding rule corresponding to the APP protocol to the forwarding device.

6. The method according to claim 1, further comprising:
after sending the message to the corresponding APP server directly or sending the message to the corresponding terminal directly,
sending, by the APP server, a state update message to the SDN/OpenFlow controller periodically, as required or in real time; and
updating, by the SDN/OpenFlow controller, a forwarding rule of a data message according to the state update message, and sending the updated forwarding rule of the data message to the forwarding device initiatively or after receiving a request from the forwarding device.

7. The method according to claim 1, wherein the SDN/OpenFlow controller generates the forwarding rule of the APP protocol corresponding to the APP server according to a registration message sent by the APP server.

8. A system for forwarding information of Application (APP) protocol in a distributed network, comprising a forwarding device and a Software Defined Networking (SDN)/OpenFlow controller, wherein the forwarding device is configured to send, when receiving a message of an Application (APP) protocol, the message to a corresponding APP server directly or send the message to a corresponding terminal directly according to a forwarding rule that is sent by the SDN/OpenFlow controller and corresponds to the APP protocol; and the SDN/OpenFlow controller is configured to send the forwarding rule corresponding to the APP protocol to the forwarding device;

wherein the forwarding rule is a matching condition and a matching result of all types of messages corresponding to the APP protocol, wherein the matching condition includes a protocol type and a target Media Access Control, MAC, Address, and the matching result is information of an output interface of the forwarding device.

9. The system according to claim 8, wherein
the forwarding device is further configured to check whether there is the forwarding rule corresponding to the APP protocol stored in the forwarding device, and if no, acquire the forwarding rule corresponding to the APP protocol from the SDN/OpenFlow controller, and send the message to the corresponding APP server directly or send the message to the corresponding terminal directly according to the forwarding rule corresponding to the APP protocol; otherwise, send the message to the corresponding APP server directly or send the message to the corresponding terminal directly according to the forwarding rule corresponding to the APP protocol.

10. The system according to claim 9, wherein
the forwarding device is further configured to initiate a query message to the SDN/OpenFlow controller; and
accordingly, the SDN/OpenFlow controller is further configured to send the forwarding rule corresponding to the APP protocol to the forwarding device according to the query message sent by the forwarding device.

11. The system according to claim 9, wherein
the SDN/OpenFlow controller is further configured to select a forwarding device according to a preset condition, and deliver the forwarding rule corresponding to the APP protocol to the forwarding device.

12. The system according to claim 8, wherein
the SDN/OpenFlow controller is further configured to select a forwarding device according to a preset condition, and deliver the forwarding rule corresponding to the APP protocol to the forwarding device.

13. The system according to claim 8, wherein
the SDN/OpenFlow controller is further configured to update a forwarding rule of a data message according to a state update message sent by the APP server periodically, as required or in real time, and send the updated forwarding rule of the terminal message to the forwarding device initiatively or after receiving a request from the forwarding device.

* * * * *